(12) United States Patent
Lam et al.

(10) Patent No.: US 9,177,068 B2
(45) Date of Patent: *Nov. 3, 2015

(54) SYSTEMS AND METHODS TO FACILITATE SEARCH OF BUSINESS ENTITIES

(75) Inventors: Man Tat Lam, El Monte, CA (US); Jay H. Lieske, Jr., Los Angeles, CA (US)

(73) Assignee: YELLOWPAGES.COM LLC

( * ) Notice: Subject to any disclaimer, the term of this patent is extended or adjusted under 35 U.S.C. 154(b) by 1283 days.

This patent is subject to a terminal disclaimer.

(21) Appl. No.: 12/186,482

(22) Filed: Aug. 5, 2008

(65) Prior Publication Data

US 2010/0036806 A1 Feb. 11, 2010

(51) Int. Cl.
| | |
|---|---|
| *G06F 17/30* | (2006.01) |
| *G06F 15/02* | (2006.01) |
| *G06Q 30/02* | (2012.01) |
| *G06Q 10/06* | (2012.01) |
| *G06F 11/07* | (2006.01) |
| *G06Q 30/00* | (2012.01) |

(52) U.S. Cl.
CPC ........ *G06F 17/3087* (2013.01); *G06F 11/0709* (2013.01); *G06F 15/0283* (2013.01); *G06F 17/30106* (2013.01); *G06F 17/30241* (2013.01); *G06F 17/30864* (2013.01); *G06Q 10/067* (2013.01); *G06Q 30/00* (2013.01); *G06Q 30/0281* (2013.01)

(58) Field of Classification Search
CPC .............. G06F 17/30; G06F 17/30528; G06F 17/30395; G06F 17/30241; G06Q 50/16; G06Q 30/02; G06Q 40/06; G06Q 40/02
USPC ......... 707/705–711, 722–723, 736–738, 758, 707/805, 14.4, 14.49, 14.54–14.55, 14.6, 707/14.73, 26.1, 26.41, 27.1
See application file for complete search history.

(56) References Cited

U.S. PATENT DOCUMENTS

| | | | |
|---|---|---|---|
| 6,336,073 B1 * | 1/2002 | Ihara et al. ..................... 701/202 |
| 6,496,843 B1 * | 12/2002 | Getchius et al. ............... 715/210 |
| 6,519,585 B1 * | 2/2003 | Kohli ..................................... 1/1 |
| 6,523,021 B1 * | 2/2003 | Monberg et al. ...................... 1/1 |
| 6,608,634 B1 * | 8/2003 | Sherrard et al. .............. 715/730 |
| 6,973,448 B1 * | 12/2005 | Monberg et al. ............. 707/694 |
| 7,266,566 B1 * | 9/2007 | Kennaley et al. ..................... 1/1 |
| 7,401,025 B1 * | 7/2008 | Lokitz ........................... 705/346 |
| 7,747,648 B1 * | 6/2010 | Kraft et al. .................... 707/790 |
| 8,423,536 B2 * | 4/2013 | Lieske et al. .................. 707/722 |
| 8,676,789 B2 * | 3/2014 | Lieske et al. .................. 707/722 |
| 8,700,447 B2 * | 4/2014 | Chappell et al. ........... 705/14.45 |
| 2004/0162738 A1 * | 8/2004 | Sanders et al. ..................... 705/1 |

(Continued)

FOREIGN PATENT DOCUMENTS

| | | | |
|---|---|---|---|
| WO | WO 00/25190 | * | 9/1999 |
| WO | WO 00/55768 | * | 9/2000 |
| WO | WO 2006108300 | * | 10/2006 |

OTHER PUBLICATIONS

Clark County Business License search website: http://web.archive.org/web/20060117082958/http://sandgate.co.clark.nv.us/businessLicense/businessSearch/blinmult.asp.*

*Primary Examiner* — Srirama Channavajjala
(74) *Attorney, Agent, or Firm* — Alston & Bird LLP

(57) ABSTRACT

Systems and methods are provided to facilitate search of listings of businesses according to opening date or age of the businesses at their current business locations. For example, a user may submit a search request for listings of new businesses (e.g., the businesses having the "Grand Opening" status) at a location specified by the user.

15 Claims, 4 Drawing Sheets

(56) References Cited

U.S. PATENT DOCUMENTS

| | | | |
|---|---|---|---|
| 2004/0172372 A1* | 9/2004 | Wells et al. | 705/400 |
| 2004/0204958 A1* | 10/2004 | Perkins et al. | 705/1 |
| 2005/0234877 A1* | 10/2005 | Yu | 707/3 |
| 2005/0267893 A1* | 12/2005 | Headd et al. | 707/10 |
| 2005/0273469 A1* | 12/2005 | Monberg et al. | 707/100 |
| 2006/0106615 A1* | 5/2006 | Tateishi et al. | 704/275 |
| 2006/0116922 A1* | 6/2006 | Homann et al. | 705/10 |
| 2006/0123014 A1* | 6/2006 | Ng | 707/100 |
| 2006/0200490 A1* | 9/2006 | Abbiss | 707/102 |
| 2007/0168267 A1* | 7/2007 | Zimmerman et al. | 705/35 |
| 2008/0065694 A1* | 3/2008 | Qian | 707/104.1 |
| 2008/0133488 A1* | 6/2008 | Bandaru et al. | 707/3 |
| 2008/0240397 A1* | 10/2008 | Abhyanker | 379/218.01 |
| 2008/0270151 A1* | 10/2008 | Mahoney et al. | 705/1 |
| 2008/0282151 A1* | 11/2008 | Egnor | 715/255 |
| 2008/0313094 A1* | 12/2008 | Wright | 705/36 R |
| 2008/0313142 A1* | 12/2008 | Wang et al. | 707/3 |

* cited by examiner

SYSTEMS AND METHODS TO FACILITATE SEARCH OF BUSINESS ENTITIES

FIELD OF THE TECHNOLOGY

At least some embodiments disclosed herein relate to search and presentation of information in general and, particularly but not limited to, searching for information related to businesses.

BACKGROUND

An end user may be interested in information about business entities near a particular location, such as service providers of a particular category near the current location of the end user, or a different location specified by the end user.

Thus, some web sites allow an end user to search for providers of services and/or products by entering one or more keywords and a location of interest. After a keyword search, the web site may sort and present the search results to the end user. Alternatively, a web site may organize the categories of businesses according to a predetermined hierarchy to allow a user to browse categories of providers of services and/or products.

For example, a web site may present business listings of various services and/or products based on locations and based on user entered search terms or based on selections from a predetermined set of categories.

For presentation a web site may sort the search results based on the distance between the location of interest to the end user and the locations of the business entities, or based on a different criterion, such as price, advertisement fee, user ratings, etc.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure provides systems and methods to facilitate search of listings of businesses according to opening date or age of the businesses at their current business locations. For example, a data storage facility stores data indicative of the opening date or age of the businesses with the listings of the business entities to allow a user to submit a search request for listings of new businesses (e.g., the businesses having the "Grand Opening" status) at a location specified by the user. The disclosure includes methods and apparatuses which perform these methods, including data processing systems which perform these methods, and computer readable media containing instructions which when executed on data processing systems cause the systems to perform these methods.

Figure 1:
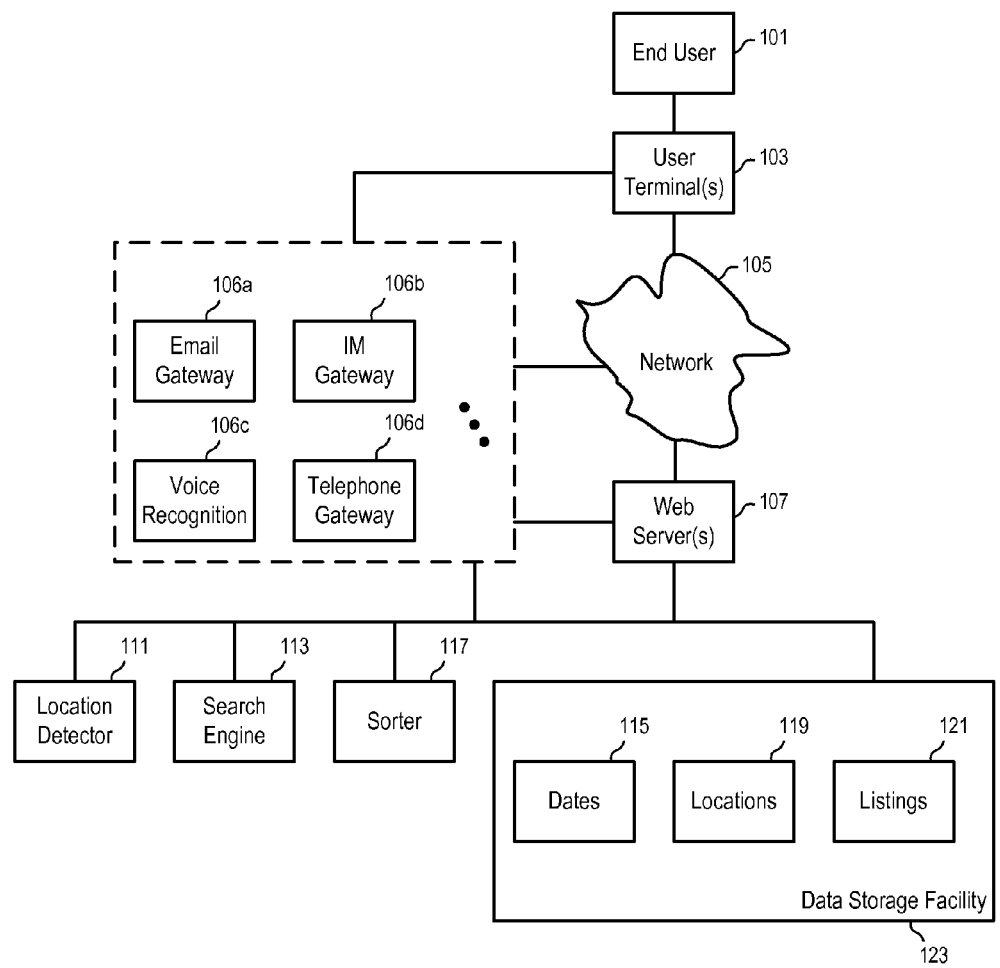
FIG. 1 shows a system to facilitate search and/or presentation of listings according to one embodiment.

FIG. 1 shows a system to facilitate search and/or presentation of listings according to one embodiment.

In FIG. 1, an end user (101) uses a user terminal (103) to submit a search request to a web server (107) over the network (105). The web server(s) (107) are configured to communicate with a location detector (111), a search engine (113), a sorter (117) to process the search request and present search results based on the information stored in a data storage facility (123), such as opening dates (115) of the business entities, locations (119) of the business entities and listings (121) of the business entities. The network (105) may include a local area network, a wireless data communication network, a telephone network, a cellular communication network, a telecommunication network, an interactive television network, an Internet Protocol Television (IPTV) network, an intranet, or a combination of networks, such as the Internet.

For example, listings (121) of businesses or people, such as restaurants, car dealers, retailer locations, service providers, gas stations, parking lots, plumbers, and the like, may have street addresses or other location parameters, such as longitude and latitude coordinates, stored as locations (119). The listings (121) may include addresses, telephone numbers, advertisements, announcements, events, etc. The locations (119) may be part of the listings (121), or associated with the listings (121). In one embodiment, the listings (121) are information related to business entities at corresponding business locations (119); and the businesses start their services on the corresponding dates (115) at their current geographic locations (119). Some of the entities may be advertisers who pay advertisement fees to promote their listings (121). Some of the entities may be non-advertisers who have free listings (121).

In some embodiments, the data storage facility (123) stores status data indicative of the dates, instead of the exact opening dates of the businesses of the listings (121). For example, a listing (121) may have a status of "Grand Opening", which expires after a period of time. In one embodiment, the data storage facility (123) may store the number of years the business of the listing (121) has been in service at its current geographic location (119). In some embodiment, the data storage facility (123) may store a status indicating the level of past operations (e.g., long, short, medium, etc.) the business of the listing (121) has been in service at its current geographic location (119).

In one embodiment, the location detector (111) determines a location of interest to the end user (101) related to the search request. The end user (101) may explicitly specify the location of interest in the search request; and the location detector (111) extracts the location of interest from the search request.

Alternatively, the end user (101) may implicitly specify the location of interest based on a preference stored and associated with identification information of the end user (101) or the user terminal (103).

In some embodiments, the location detector (111) automatically identifies the location of interest based on determining the current location of the user terminal (103) that submits the search request. For example, the location detector (111) may determine the location of the user terminal (103) based on a connection point of the user terminal (103) to access the network (105) (e.g., based on the location of a wireless network access point, or a base station of a cellular communication system, or a connection point to a wired network). In some embodiments, the user terminal (103) automatically determines its current position (e.g., via a satellite positioning system, or a cellular positioning system) and transmits the determined or estimated position to the web server (107) with the search request, or provides the position in response to a request from the location detector (111).

In FIG. 1, the search engine (113) retrieves information from the data storage facility (123) according to the search request. The sorter (117) ranks the listings (121) in the search results for presentation in an order according to one or more parameters, such as dates (115), distance to the location of interest, popularity, user ranking, price, and/or advertisement fees.

For example, the end user (101) may specify a keyword; and the search engine (113) selects listings (121) that match the keyword, that have locations (119) near the location of interest identified by the location detector (111), and that have a status of "Grand Opening" (e.g., according to the dates (115)).

In one embodiment, a listing (121) has a "Grand Opening" status if the business of the listing (121) opened at the current geographic location (119) within a predetermined period of time (e.g., a month, three months, six months, a year). The web server (107), or the sorter (117) or another module not shown in FIG. 1, compares the opening date (115) of the listing (121) to the current date to determine whether the listing (121) has a "Grand Opening" status.

In one embodiment, a listing (121) has a "Grand Opening" status when the business entity, or a third party, submits the listing (121) as a new listing (121) of business of services or products. The business entity, or a third party, may submit the listing (121) with an indication of whether the business described by the listing (121) is new or not. If the business described by the listing (121) is new at the location (119), the listing (121) has the "Grand Opening" status until a predetermined period of time elapses. For example, the data storage facility may store the dates (115) on which the web server (107) assigns the "Grand Opening" status to the listing (121); and the search engine (113), or the sorter (117), compares the dates (115) and the current date to determine whether the listing (121) currently has the "Grand Opening" status.

In one embodiment, a business entity may have different listings (121) for the different locations (119); and because of the different locations (119) the different listings (121) of the business entity may have different statuses related to "Grand Opening". Alternatively, a business entity having different business locations (119) may have one listing (121) but separate data stored to represent the different locations (119) and the different dates (115).

In one embodiment, the end user (101) may specify a keyword and a criterion based on how long the businesses are in service to formulate a search request. For example, the end user (101) may search for listings related to "coffee" that have been in services for more than a user-specified number of years, or search for a user-specified type of restaurants that have been in services near a location of interest for less than a user-specified period of time.

In one embodiment, the web server (107), the search engine (113), the sorter (117), or a module not shown in FIG. 1, determines a geographic area based on the location of interest. For example, the geographic area may be an area within a predetermined radius from the location of interest. For example, the geographic area may be a city (or county or state) in which the location of interest is located. The search engine (113) then searches for listings (121) within the determined geographic area.

In one embodiment, the search engine (113) adaptively adjusts the geographic area of the search based on the number of listings (121) in the search results. When the number of listings (121) matching the searching criteria is less than a threshold, the search engine (113) automatically increases the geographic area (e.g., the radius) to select more listings (121). When the number of listings (121) matching the searching criterion is more than a threshold, the search engine (113) automatically decreases the geographic area (e.g., the radius) to limit the number of listings (121) in the search result. For example, the search engine (113) may automatically adjust the geographic area to eliminate some listings (121) from the previous search results.

In one embodiment, the search engine (113) or the sorter (117) may adjust the geographic area based on an estimated transportation distance, such as a driving distance or a walking distance, measured according to a map. In one embodiment, the search engine (113) adjusts the geographic area based on estimated transportation time. For example, the search engine (113) may contact a web-based navigation service provider (not shown in FIG. 1) to obtain estimated transportation time. Alternatively, the data storage facility may store map related data; and a navigation module (not shown in FIG. 1) connected to the search engine (113) can determine the estimated transportation time. In some embodiments, the search engine (113) adjusts the geographic area based also on real time traffic conditions. For example, when the search engine (113) contacts a web-based navigation service provider (not shown in FIG. 1) to obtain estimated transportation time, the web-based navigation service provider uses the real time traffic conditions to estimate the transportation time. Alternatively, a navigation module (not shown in FIG. 1) may contact a web-based traffic condition provider (not shown in FIG. 1) to obtain the real time traffic conditions and determine the estimated transportation time.

In some embodiments, the search engine (113) and/or the sorter (117) implicitly adjusts the geographic area based on a measure of distance to the location of interest. The measure of distance may be a line-of-sight distance, a driving distance, a walking distance, an estimated travel time, etc. The sorter (117) sorts the listings (121) according to the measure of distance to select a desirable amount of listings (121).

In one embodiment, the sorter (117) uses the dates (115) to sort the listings (121) in the search result identified by the search engine (113). For example, the search engine (113) may identify a subset from the listings (121) based on the locations (119) but not the dates (115); and the sorter (117) ranks the subset of listings (121) based at least in part on the dates (115).

For example, the sorter (117) may sort to the top the listings (121) that have the "Grand Opening" status. For example, the sorter (117) may use the "Grand Opening" status (e.g., identified based on the dates (115)) as a primary parameter for sorting, and use the price, user ratings, advertisement fees, popularity, or distance to the location of interest as a secondary parameter for listings (121) have the same values for the primary parameter.

In another example, the sorter (117) uses the "Grand Opening" status as a second parameter for sorting.

In one embodiment, the sorter (117) ranks the listings (121) in the search results based on an advertisement fee paid or offered by the entities, the status of whether an entity is an advertiser, the price offered by an entity for its service or product, a user rating of the entity computed based on feedbacks from prior customers of the entity, a popularity of an entity (e.g., connection in a social network to other entities, a rate of being selected by customers, etc.), a score indicative of relevance between the listing (121) of an entity and the search criterion specified by the end user (101), etc. The data storage facility (123) may store such information used by the sorter (117). The sorter (117) may combine a plurality of parameters to generate a ranking indicator to rank the search results. Alternatively, the sorter (117) may use one parameter as the primary parameter, one parameter as the secondary parameter, etc., to sort the listings (121) in the search results based on a hierarchy of parameters.

In one embodiment, both the search engine (113) and the sorter (117) use the dates (115). For example, the search engine (113) uses the dates (115) to select listings (121) that have the "Grand Opening" status (or having been in service for more than a user specified threshold, or less than a user specified threshold); and the sorter (117) ranks the listings (121) selected by the search engine (113) based on the opening dates (115) of the corresponding businesses.

In one embodiment, the user terminal (103) is a data processing system, such as a notebook computer, a personal computer, a workstation, a network computer, a personal digital assistant (PDA), a mobile phone, a cellular phone, a television set with or without a set top box, a game console, an electronic kiosk, microprocessor-based or programmable consumer electronics, and the like.

In one embodiment, the user terminal (103) includes a web browser which allows the end user (101) to submit a search request to one of the web servers (107) for location dependent information, such as a listing (121) of businesses or people, such as restaurants, car dealers, retailer locations, service providers, gas stations, parking lots, plumbers, and the like. Alternatively, the user terminal (103) may provide the search request via other communication channels, such as email, short message service (SMS), instant messaging (IM), telephone connection, etc. For example, the user terminal (103) may provide the search request to an email gateway (106a) via email, or to an IM gateway (106b) via instant messaging, or to a telephone gateway (106d) via a telephone call. Some embodiments may use other types of gateways not shown in FIG. 1, such as gateways for SMS or gateways for television based data communication. Thus, the disclosure is not limited to the examples or combinations illustrated in FIG. 1.

In some embodiments, the end user (101) may use one user terminal (103) to submit the request and another user terminal (103) to receive the results. For example, the user (101) may submit the search request via an SMS message through user terminal (103), and receive the search request at another user terminal (103) via email. For example, the user may submit the search request via voice through user terminal (103) and receive the search request via a web page at another user terminal (103) or at the same user terminal (103). For example, in one embodiment, the user (101) may use a mobile phone as the user terminal (103) to transmit voice information, via a data connection through the network (105) and the web server (107) (or email gateway (106a), or IM gateway (106b), or other data communication gateways), or a telephone connection through a telephone gateway (106d)), to a voice recognition system (106c) to formulate a search and receive a web page or email at the same user terminal (103) or at another user terminal (103) that shows the result of the search.

In one embodiment, one computer system implements the web servers (107), the location detectors (111), the search engine (113), and the sorter (117). Alternatively, different processes running on one or more shared computers may implement some of the components (107, 111, 113, and 117). For example, one computing module, thread, or process may implement multiple of the components (107, 111, 113, and 117). In some embodiments, special purpose data processing systems implement the one or more of the components (107, 111, 113, and 117), such as using Application-Specific Integrated Circuit (ASIC) or Field-Programmable Gate Array (FPGA). In some embodiments, processes running on general purpose data processing systems, such as general purpose personal computers or server computers, according to software instructions can implement the components (107, 111, 113, and 117). Thus, the implementations are not limited to hardware, software, or particular combinations of hardware and software.

Different embodiments may implement the data storage facility (123) in different ways. For example, one or more data processing systems may store the information about the dates (115), the locations (119) and the listings (121). For example, one or more relational or object oriented databases, or flat files on one or more computers or networked storage devices, may store the information about the dates (115), the locations (119) and the listings (121). In some embodiments, a centralized system stores the information about the dates (115), the locations (119) and the listings (121); alternatively, a distributed system, such as a peer to peer network, or Internet, may store the information about the dates (115), the locations (119) and the listings (121).

Figure 2:
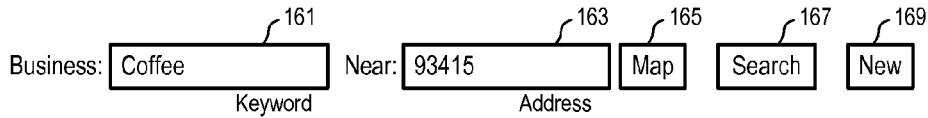
FIG. 2 illustrates a user interface to search new businesses according to one embodiment.

FIG. 2 illustrates a user interface to search new businesses according to one embodiment.

In FIG. 2, a user terminal (e.g., 103) provides a search user interface (150), which includes an input box (161) to receive one or more keywords, an input box (163) to receive a location of interest. The end user (101) may alternatively use the icon button (165) to select the location of interest from an interactive map.

In FIG. 2, after the end user (101) specifies the keyword in the input box (161) and the location of interest in the input box (163), the end user (101) can select the search button (167) to search for listings (121) of businesses that match the keyword and that are located near the location of interest. The end user (101) may select the icon button (169) to request listings (121) of new businesses that match the keyword and that are located near the location of interest. In one embodiment, new businesses are those who have a grand-opening status at the locations (119) near the location of interest.

After the search interface (150) receives the selection of the search button (169) (or the icon button (169) for listings (121) of new businesses), the user terminal (103) submits the search request to web server(s) (107).

In some embodiments, the search interface (150) provides a further input box (not shown in FIG. 2) to specify a search criterion base on the opening dates (115) of the listings (121). For example, the end user (101) may specify a number of years or months to request listings (121) of businesses that have been in services near the location of interest for more than the user-specified number of years or months, or listings (121) of businesses that have been in services near the location of interest for less than the user-specified number of years of months. For example, the end user (101) may be interested in listings (121) of new businesses identified by the keyword, or listings (121) of well established businesses related to the keyword, in a geographic area near the location of interest.

In one embodiment, the end user (101) implicitly specifies the location of interest based on the location of the user terminal (103), or based on a preference setting of the end user (101). In one embodiment, the location detector (111) determines the location of the user terminal (103) or the preference setting of the end user (101) as a default location; and the user interface (150) shows the default location in the input box (163) for verification and/or modification.

For example, the user terminal (103) (e.g., with a global positioning system (GPS) unit) or the location detector (111) can automatically determine the current location of the user terminal (103) that presents the search user interface (150). The input box (163) displays the automatically determined location of the user terminal (103) as a default location; and the user may specify an alternative location via the input box (163) (or via the icon button (165)).

In FIG. 2, the user interface (150) presents the search results under the input boxes (162 and 163). In the example illustrated in FIG. 2, the user interface (150) presents listings (121) of business products and services in response to a search request.

In FIG. 2, the user interface (150) presents the listings (121) in an order according to the opening dates (115) of the businesses at the locations (119) indicated in the corresponding listings (121). In some embodiments, the user interface (150) presents the listings (121) in an order according to a measure of distance to the location of interest, such as an estimated transportation time, a driving distance, a line-of-sight distance, etc.

In FIG. 2, the user interface (150) presents a listing (121), such as the listing (121) for "Star Coffee", with various information about the entity, including the street address, a telephone contact (153), a distance (155) to the location of interest, a user rating (151), and options (157) to contact the entity via other communication channels and/or to obtain additional information via other communication channels.

In one embodiment, the listing (121) represents a business of products or services. The technologies disclosed herein can be used, for example, in a web site such as Yellowpages.com. The business entity of the listing (121) may pay a fee to become an advertiser or not pay a fee to have a free listing (121).

In one embodiment, the advertiser pays a predetermined fee for priority in the display of the listings (121). For example, the advertiser may pay a monthly advertisement fee, or an advertisement fee charged for a predetermined number of presentations, to obtain a high priority in the ranking of the listings (121).

In another embodiment, the advertiser pays a predetermined fee when a link presented in the listing (121) forwards the end user (101) to a web location specified by the advertiser, such as a web site of the advertiser. In one embodiment, the advertiser pays a predetermined fee when the end user (101) calls the advertiser using the telephone contact provided in the listing (121).

In one embodiment, the operator of the search engine (113) specifies the predetermined advertisement fees. In another embodiment, the advertiser specifies and offers the predetermined advertisement fees; and the advertisers can adjust the offer of the advertisement fees to balance the need for a high ranking with their group and the cost.

In FIG. 2, the listings (121) provide the "call" link to allow a customer to request a call back to the customer for a phone connection to the advertiser. When a telephonic device (e.g., a mobile phone or a computer having a phone implemented partially via software, etc.) presents the listing (121), the customer can use the "call" link to initiate a call from the telephonic device.

In FIG. 2, the listings (121) provide the "email" link to send the listing (121) and/or the phone number via email to an address specified by the user (101). The user (101) can select the menu (157) for more options, such as an option to send the phone number via SMS, an option to save the listing (121) as a note, an option to bookmark the listing (121), etc.

In FIG. 2, the listing (121) for "Bean Cafe" includes a "web site" link, which when selected by the end user (101) forwards the end user (101) to the web site of the business "Bean Cafe", or an information page hosted on the web server (107) to provide further details about the business, such as the business hours, payment options accepted by the business, a detailed description of the business, videos related to the business, etc.

In FIG. 2, the listings (121) also include links related to customer ratings of the businesses based on feedback from prior customers of the business. For example, a user (101) may read reviews wrote by other users, or to write and/or rate the business.

In some embodiments, the listings (121) include banner or video advertisements from the corresponding entities (advertisers). The listings (121) may include links to web locations specified by the advertisers.

For example, in one embodiment, the heading "Star Coffee" includes a link to a web site to the business/advertiser of the listing (121). When the end user (101) selects the link, the link directs the end user (101) to the web site of the business/advertiser; and the advertiser may pay a per-selection advertisement fee, for the end user (101) that is directed by the link to the web site of the business/advertiser.

Alternatively or in combination, the end user (101) may call the telephone contact (153) provided in the listing (121); after a connection server connects the telephone call from the end user (101) to the business/advertiser, the advertiser may pay a per-call advertisement fee, responsive to the call that is directed by the telephone contact (153) to the business/advertiser.

In one embodiment, to track the calls forwarded to the business/advertiser, the listing (121) provides a telephone number of a connection server as the telephone contact (153) of the listing (121). When the connection server receives the call to the telephone number of the connection server, the connection server forwards the call to the telephone number of the business/advertiser, or makes a separate call to the telephone number of the business/advertiser and bridges the calls to make the connection.

Figure 3:
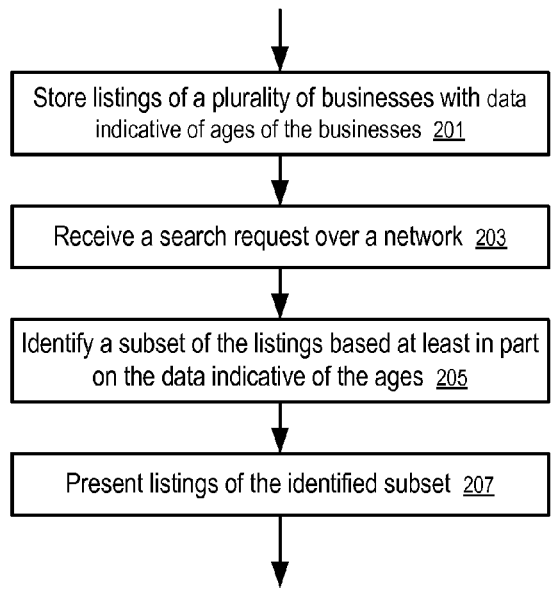
FIG. 3 illustrates a method to search for business listings according to one embodiment.

FIG. 3 illustrates a method to search for business listings (121) according to one embodiment.

In FIG. 3, a data storage facility (123) stores (201) listings (121) of a plurality of businesses with data indicative of ages of the businesses, such as opening dates (115) of the businesses at the locations (119) of the listings (121). After a web server (107) receives (203) a search request over a network, such as network (105), from a user terminal (103), the search engine (113) identifies (205) a subset of the listings based at least in part on the data (115) indicative of the ages of the businesses. The web server (107) then presents (207) listings (121) of the identified subset, in response to the search request from the end user (101).

In one embodiment, the web server (107) includes an application programming interface (API) to allow a third party application to submit the search request and to retrieve the listings (121) of the identified subset.

In one embodiment, the web server (107) provides a web interface to receive the search request from a web browser running on the user terminal (103) and to present the listings (121) of the identified subset via the web browser. As illustrated in FIG. 2, the web interface may include an input field (161) to receive a search term and a user interface element (167 or 169) selectable to submit the search request with the search term. In one embodiment, the user interface element (e.g., 169) is pre-associated with a criterion based on the data indicative of the ages of the businesses. For example, the criterion requires business of the identified subset of listings (121) be established within a predetermined time period (e.g., to have the status of new business or "Grand Opening" at the current geographic location (119) of the business). For example, the end user (101) may specify an age threshold to request the businesses of the listings (121) in the identified subset be younger than the age threshold (or older than the age threshold).

In one embodiment, the end user (101) can specify the location of interest in an input box (163) separate from the input box (161) for the search term or keyword. In some embodiments, the end user (101) can specify both the location of interest and the search term/keyword the same input box (161) (e.g., by entering "coffee 93415" in the input box (161)); and the location detector (111) detects and extracts the user specified location of interest from the input box (161). In some embodiments, the user (101) can further specify the criterion related to the opening dates of the businesses (e.g., by entering "grand opening coffee 93415") in the input box (161). Thus, in response to the search request, the web interface provides listings (121) of businesses that match the keyword, that are located within an geographic area identified based on the location of interest, and that are established or opened business at the corresponding location (119) according to the requirement specified by the end user (101).

In one embodiment, the listings (121) include locations (119) as illustrated in FIG. 2; and the data storage facility (123) stores dates (115) on which the businesses opened at the locations (119) respectively. In some embodiment, the data storage facility (123) stores status indicators showing whether the businesses had "Grand Opening" at the locations respectively within a predetermined time period to indicate the age of the businesses.

In one embodiment, the sorter (117) sorts the identified subset based at least in part on the data indicative of ages of the businesses (e.g., to prioritize the listings (121) based on the how long the businesses have been in services at their current locations (119)).

Figure 4:
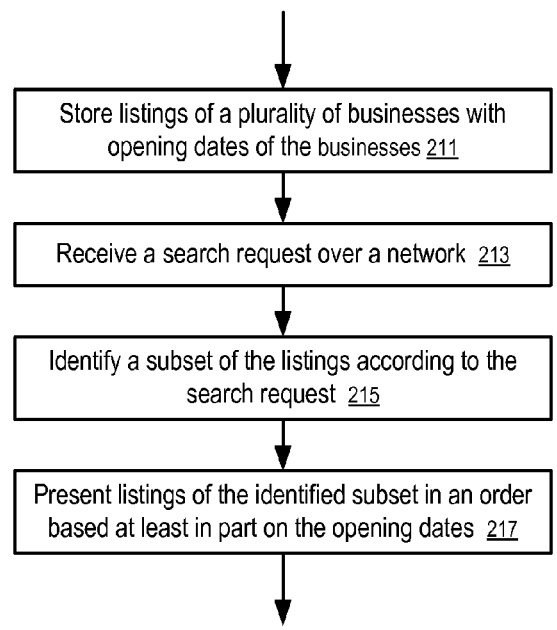
FIG. 4 illustrates a method to present business listings according to one embodiment.

FIG. 4 illustrates a method to present business listings (121) according to one embodiment.

In FIG. 4, a data storage facility (123) stores (211) listings (121) of a plurality of businesses with opening dates (115) of the businesses. After a web server (107) receives (213) a search request over a network (105) from an end user (101) via a user terminal (103), the search engine (113) identifies (215) a subset of the listings (121) according to the search request. As a response to the search request from the end user (101), the web site (107) then presents (217) listings (121) of the identified subset, in an order determined by the sorter (117) based on at least in part on the opening dates (115).

In one embodiment, the web server (107), the search engine (113), the sorter (117), or another module not shown in FIG. 1 identifies an geographic area; the identified subset is within the geographic area; and the sorter (117) increases a priority of a first listing in the identified subset in response to a determination that the first listing opened business at a location within the geographic area within a predetermined period of time from the search request. For example, the sorter (117) may increase the priority of the first listing because of the "Grand Opening" status of the first listing at its current business location, even if the first listing is not an advertiser who pays the search engine (113).

In one embodiment, the sorter (117) selects the identified subset for presentation according to a location identified in the search request and based on a determination that businesses described in the identified subset have "Grand Opening" near the location within a predetermined number of months or days.

Figure 5:
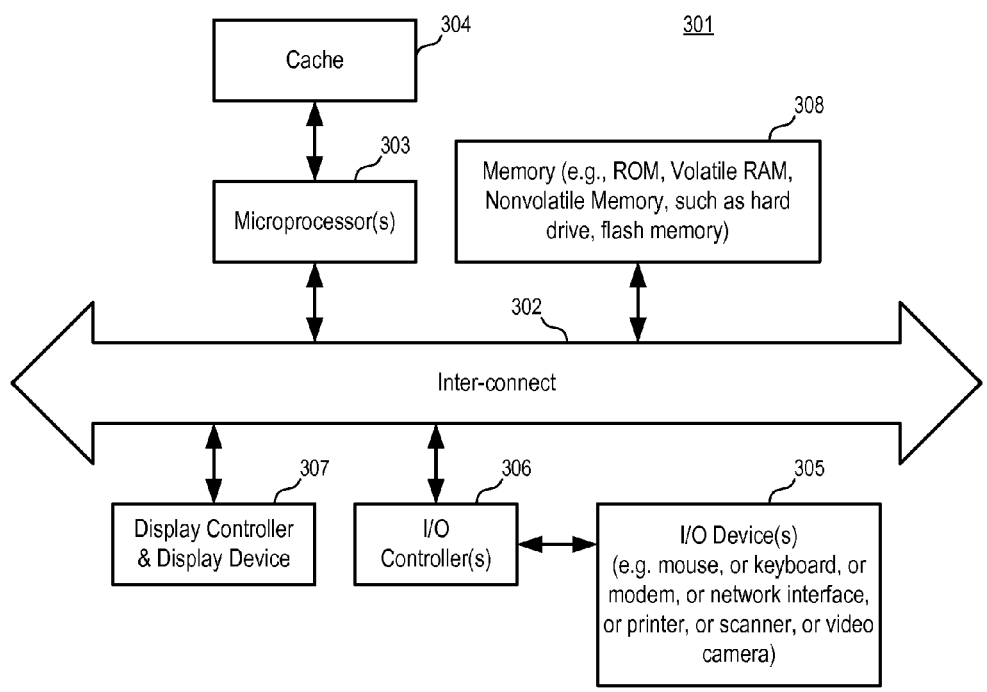
FIG. 5 illustrates a data processing system which can be used in various embodiments.

FIG. 5 illustrates a data processing system which can be used in various embodiments. While FIG. 5 illustrates various components of a computer system, it is not intended to represent any particular architecture or manner of interconnecting the components. Other systems that have fewer or more components may also be used.

In one embodiment, a server data processing system as illustrated in FIG. 5 is used as one of the web server(s) (107), a location detector (111), a search engine (113), a sorter (117), and/or a storage facility (123) for storing dates (115), locations (119) and listings (121), etc. In some embodiments, one or more servers (e.g., 107, 111, 113, 117, 123) of the system can be replaced (e.g., by a system designer) with the service of a peer to peer network of a plurality of data processing systems, or a network of distributed computing system. The peer to peer network, or a distributed computing system, can be collectively viewed (e.g., by the reader of the description) as a server data processing system.

In one embodiment, a user terminal (103) is a data processing system as illustrated in FIG. 5 to provide the user interface illustrated FIG. 2.

In FIG. 5, the data processing system (301) includes an inter-connect (302) (e.g., bus and system core logic), which interconnects a microprocessor(s) (303) and memory (308). The microprocessor (303) is coupled to cache memory (304) in the example of FIG. 5.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art. In some embodiments, when the data processing system is used a server system, some of the I/O devices, such as printer, scanner, mice, keyboards are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:

processing first data and second data received via a communication network by one or more interfaces facilitated by a server system, the first data indicative of a first age of a first business, and the second data indicative of a second age of a second business;

storing, by the server system in a data storage facility of the server system, listings of a plurality of businesses, including data indicative of ages of the businesses, wherein the data comprises the first data indicative of the first age of the first business and the second data indicative of the second age of the second business;

at a first time, generating by the server system a first indication of a first level of past operations of the first business at least in part by:

comparing, by the server system, the first data indicative of the first age of the first business to a first threshold corresponding to a first time period of past operations;

determining, by the server system, whether the first data indicative of the first age of the first business satisfies the first threshold; and assigning, by the server system, a first status to a first listing corresponding to the first business based at least in part the determining whether the first data satisfies the first threshold and storing a first status indicator in association with the first listing in the data storage facility;

at a second time, generating by the server system a second indication of a second level of past operations of the second business at least in part by:
comparing, by the server system, the second data indicative of the second age of the second business to a second threshold corresponding to a second time period of past operations;
determining, by the server system, whether the second data indicative of the second age of the second business satisfies the second threshold; and
assigning, by the server system, a second status to a second listing corresponding to the second business and storing a second status indicator in association with the second listing in the data storage facility based at least in part the determining whether the second data satisfies the second threshold, wherein the second status is different from the first status;
processing a transmission received via the communication network by the server system to facilitate an interface to a search engine of the server system, the transmission corresponding to a search request, the interface for the search request including an input field to receive a search term and a user interface element selectable to indicate a level of past operations, wherein the search term further includes a location of interest specified in the interface;
responsive to the search request:
identifying, via the search engine, a subset of the listings based at least in part on i) the indicated level of past operations, ii) the data indicative of the ages of the businesses, and iii) a geographic area identified based on the location of interest, and retrieving the subset of the listings from the data storage facility, wherein the identifying comprises:
assigning the second status to the first listing corresponding to the first business based at least in part on a difference between the first time and the third time;
selecting the first listing and the second listing to form the subset of the listings based at least in part on the second status assigned to the first listing and the second listing; and
sorting the subset of the listings based at least in part on statuses assigned to each listing of the subset of the listing, the statuses based at least in part on the data indicative of the ages of the businesses and comprising the second status; and
transmitting by the server system the subset of the listings via the communication network to an end-user device to facilitate, via the interface, the subset of the listings in the sorted order, wherein the listings of the subset of the listings indicate respective opening dates of respective businesses at respective locations.

2. The method of claim 1, wherein the interface comprises an application programming interface to allow a third party application to submit the search request and to retrieve the listings of the identified subset.

3. The method of claim 1, wherein the user interface element is pre-associated with a criterion based on the data indicative of the ages of the businesses.

4. The method of claim 3, wherein the criterion requires listings of the identified subset be established within a predetermined time period from the search request.

5. The method of claim 1, wherein the subset of the listings is identified based at least in part on whether the respective business had a grand opening at the respective location within a predetermined time period from the search request.

6. The method of claim 1, wherein the listings of the businesses comprise listings of at least one of a product or a service.

7. The method of claim 1, wherein the listings of the businesses comprise respective telephonic contact information for the respective businesses.

8. The method of claim 7, wherein the listings of the businesses further comprise respective address information for the respective businesses.

9. The method of claim 7, wherein at least one of the identified subset is a listing of an advertiser; and the listing of the advertiser includes one of a banner or a video advertisement.

10. One or more non-transitory, machine-readable media storing instructions, that when executed by a server system cause the server system to perform a method, the method comprising:
processing first data and second data received via a communication network by one or more interfaces facilitated by the server system, the first data indicative of a first age of a first business, and the second data indicative of a second age of a second business;
storing in a data storage facility of the server system listings of a plurality of businesses, including data indicative of ages of the businesses, wherein the data comprises the first data indicative of the first age of the first business and the second data indicative of the second age of the second business;
at a first time, generating a first indication of a first level of past operations of the first business at least in part by:
comparing the first data indicative of the first age of the first business to a first threshold corresponding to a first time period of past operations;
determining whether the first data indicative of the first age of the first business satisfies the first threshold;
assigning a first status to a first listing corresponding to the first business based at least in part the determining whether the first data satisfies the first threshold and storing a first status indicator in association with the first listing in the data storage facility;
at a second time, generating a second indication of a second level of past operations of the second business at least in part by:
comparing the second data indicative of the second age of the second business to a second threshold corresponding to a second time period of past operations;
determining whether the second data indicative of the second age of the second business satisfies the second threshold; and
assigning a second status to a second listing corresponding to the second business and storing a second status indicator in association with the second listing in the data storage facility based at least in part the determining whether the second data satisfies the second threshold, wherein the second status is different from the first status;
processing a transmission received via the communication network by the server system to facilitate an interface to a search engine of the server system, the transmission corresponding to a search request, the interface for the search request including an input field to receive a search term and a user interface element selectable to indicate a level of past operations, wherein the search term further includes a location of interest specified in the interface;
responsive to the search request:
the search engine identifying a subset of the listings based at least in part on i) the indicated level of past operations, ii) the data indicative of the ages of the businesses, and iii) a geographic area identified based on the location of interest, and retrieving the subset of the listings from the data storage facility, wherein the identifying comprises:
    assigning the second status to the first listing corresponding to the first business based at least in part on a difference between the first time and the third time; and
    selecting the first listing and the second listing to form the subset of the listings based at least in part on the second status assigned to the first listing and the second listing; and
    sorting the subset of the listings based at least in part on statuses assigned to each listing of the subset of the listings, the statuses based at least in part on the data indicative of the ages of the businesses and comprising the second status; and
transmitting by the server system the subset of the listings via the communication network to an end-user device to facilitate presentation of the subset of the listings through the interface in the sorted order, wherein the listings of the subset of the listings indicate respective opening dates of respective businesses at respective locations.

11. The one or more non-transitory, machine-readable media of claim 10, wherein the subset is within a geographic area identified based on the search request; and the method further comprises:
    increasing a priority of a third listing in the subset in response to a determination that a business of the third listing opened at a location within the geographic area within a predetermined period of time from the search request.

12. The one or more non-transitory, machine-readable media of claim 10, wherein the first listing is not a listing of an advertiser of the search engine.

13. The one or more non-transitory, machine-readable media of claim 10, wherein the subset of the listings is selected based at least in part on a determination that businesses of the subset of the listings have each had a grand opening near the location within a predetermined number of months and days.

14. A server system, comprising:
    a network interface configured to facilitate access to a network;
    one or more servers coupled to the network interface;
    one or more storage media coupled to the one or more servers to retain instructions, the one or more servers to execute the instructions to:
        process first data and second data received via a communication network by one or more interfaces facilitated by the server system, the first data indicative of a first age of a first business, and the second data indicative of a second age of a second business;
        store in a data storage facility of the server system listings of a plurality of businesses, including data indicative of ages of the businesses, wherein the data comprises the first data indicative of the first age of the first business and the second data indicative of the second age of the second business;
        at a first time, generate a first indication of a first level of past operations of the first business at least in part by:
            comparing the first data indicative of the first age of the first business to a first threshold corresponding to a first time period of past operations;
            determining whether the first data indicative of the first age of the first business satisfies the first threshold;
            assigning a first status to a first listing corresponding to the first business based at least in part the determining whether the first data satisfies the first threshold and storing a first status indicator in association with the first listing in the data storage facility;
        at a second time, generate a second indication of a second level of past operations of the second business at least in part by:
            comparing the second data indicative of the second age of the second business to a second threshold corresponding to a second time period of past operations;
            determining whether the second data indicative of the second age of the second business satisfies the second threshold; and
            assigning a second status to a second listing corresponding to the second business and storing a second status indicator in association with the second listing in the data storage facility based at least in part the determining whether the second data satisfies the second threshold, wherein the second status is different from the first status;
        process a transmission received via the communication network by the server system to facilitate an interface of the server system, the transmission corresponding to a search request via the network interface, the interface for the search request including an input field to receive a search term and a user interface element selectable to indicate a level of past operations, wherein the search term further includes a location of interest specified in the interface;
        responsive to the search request:
    identify by the search engine a subset of the listings based at least in part on i) the indicated level of past operations, ii) the data indicative of the ages of the businesses, and iii) a geographic area identified based on the location of interest, and retrieving the subset of the listings from the data storage facility, wherein the identifying comprises:
    assigning the second status to the first listing corresponding to the first business based at least in part on a difference between the first time and the third time;
    selecting the first listing and the second listing to form the subset of the listings based at least in part on the second status assigned to the first listing and the second listing; and
    sorting the subset of the listings based at least in part on statuses assigned to each listing of the subset of the listings, the statuses based at least in part on the data indicative of the ages of the businesses and comprising the second status; and
    transmit the subset of the listings via the communication network to an end-user device to facilitate presentation of the subset of the listings through the network interface in the sorted order, wherein the listings of the subset of the listings indicate respective opening dates of respective businesses at respective locations.

15. The system of claim 14, wherein the interface comprises an application programming interface to allow a third party application to submit the search request and to retrieve the listings of the identified subset.

* * * * *